United States Patent [19]

Nakamura et al.

[11] Patent Number: 4,506,911
[45] Date of Patent: Mar. 26, 1985

[54] MOUNTING STRUCTURE FOR ANCHOR OF AUTOMOTIVE SEAT BELT

[75] Inventors: Yoshiharu Nakamura, Atsugi; Mikio Kanda, Hiratsuka, both of Japan

[73] Assignees: Nissan Motor Company, Limited, Yokohama; Nisssan Shatai Company, Limited, Hiratsuka, both of Japan

[21] Appl. No.: 519,849

[22] Filed: Aug. 3, 1983

[30] Foreign Application Priority Data

Aug. 18, 1982 [JP] Japan .............................. 57-142964

[51] Int. Cl.³ .............................................. B60R 21/10
[52] U.S. Cl. ..................................... 280/801; 296/155
[58] Field of Search ................ 280/801, 808; 296/155, 296/202, 207

[56] References Cited

U.S. PATENT DOCUMENTS 4,157,846  6/1979  Whitcroft ............................ 296/155
4,331,349  5/1982  Funahashi ........................... 280/801

FOREIGN PATENT DOCUMENTS 30615   2/1982  Japan .................................. 296/155
39921   4/1982  Japan .................................. 296/155
126743  8/1982  Japan .................................. 280/808

Primary Examiner—Joseph F. Peters, Jr.
Assistant Examiner—Ross Weaver
Attorney, Agent, or Firm—Schwartz, Jeffery, Schwaab, Mack, Blumenthal & Koch

[57] ABSTRACT

A structure for mounting a seat belt anchor for a vehicle with a sliding door includes a reinforcement member disposed within a vehicle side frame and adapted to receive a curved end of a guide rail from which the sliding door is slidably suspended. The reinforcement member is secured to the side frame with a fastener bolt. An anchor of the seat belt is also secured to the side frame with a fastener bolt also used to secure the reinforcement member. The reinforcement member provides the side frame with sufficient structural strength to resist bending moment applied via the seat belt.

7 Claims, 5 Drawing Figures

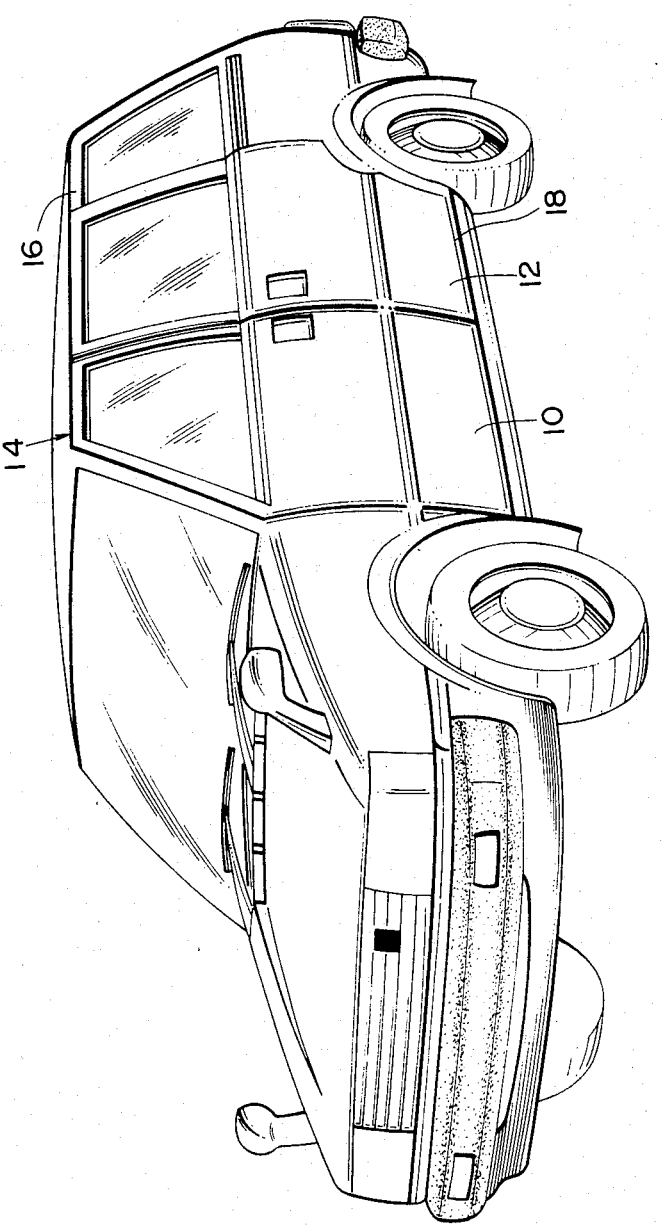

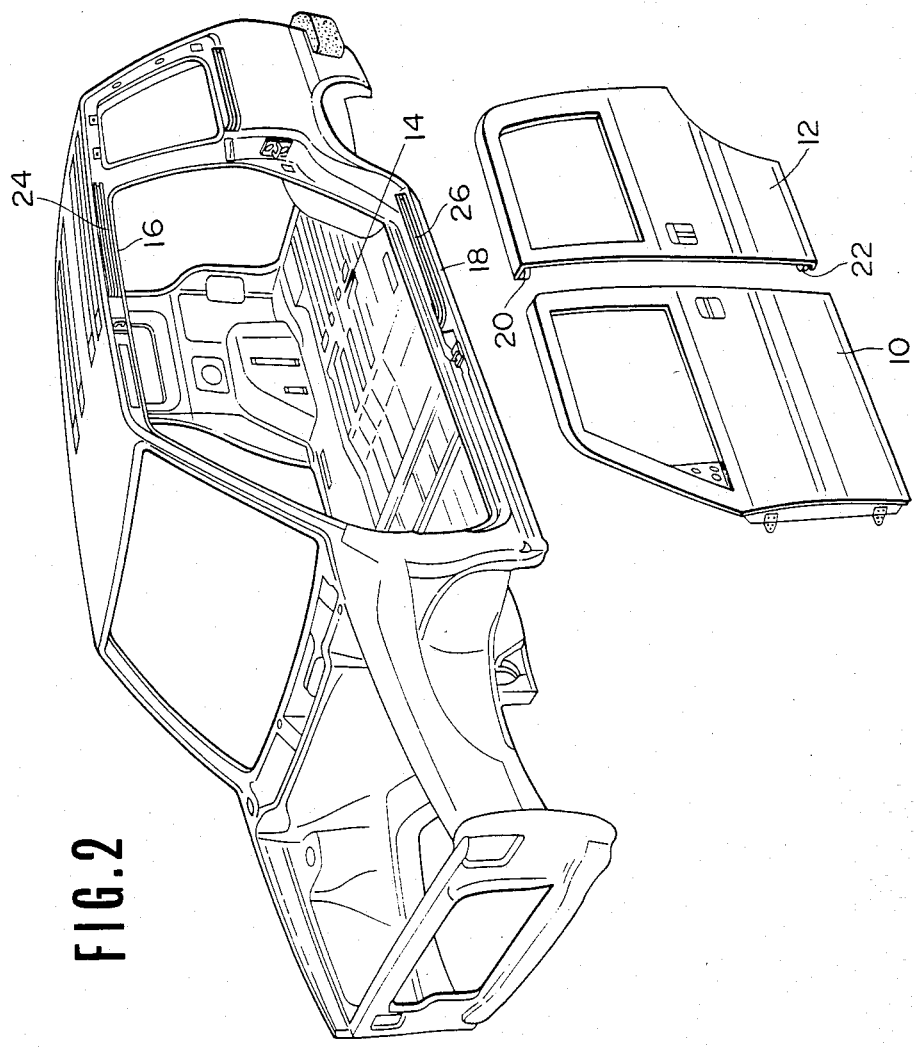

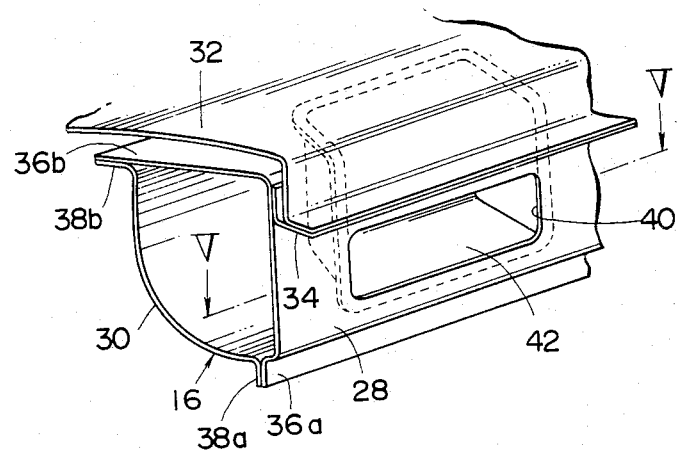
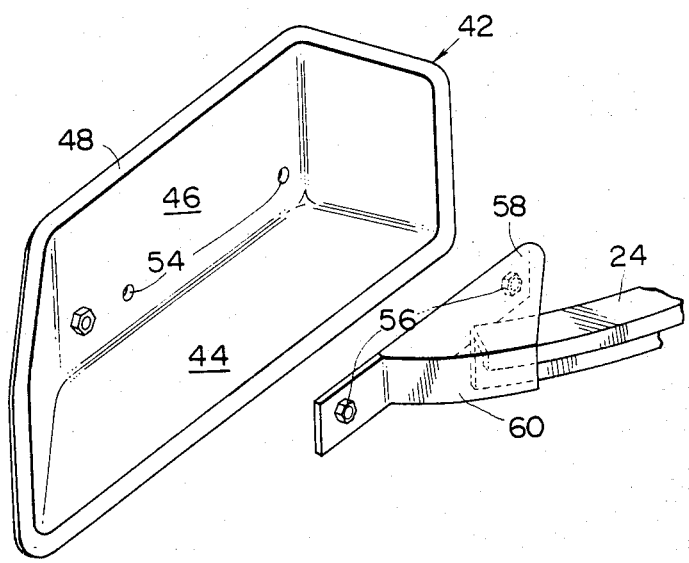

MOUNTING STRUCTURE FOR ANCHOR OF AUTOMOTIVE SEAT BELT

BACKGROUND OF THE INVENTION

The present invention relates generally to a mounting structure for an anchor of a seat belt of an automotive vehicle, especially of a vehicle having no pillar between adjacent front and rear doors. More specifically, the invention relates to a mounting structure for an anchor of an automotive seat belt for a vehicle with a sliding door.

A sliding door is generally suspended from the vehicle side with upper and lower slider assemblies engaging upper and lower guide rails for sliding movement therealong. The guide rails are respectively mounted on upper and lower side frames, such as roof side rail and side sill. The side frames are subject to both static and dynamic bending stresses due to the door weight and the door sliding movement. The bending stresses applied to the side frame in the case of vehicles having front and rear doors opposing each other directly without having a pillar therebetween, are greater that those applied to the side frames of vehicles with a pillar between front and rear doors.

On the other hand, an anchor for a seat belt needs to be mounted on the upper side frame. In this case, a difficulty is encountered in that due to the pillar-less structure, the side frame may not be sufficiently strong to support the anchor. In other words, due to lack of the strength of the side frame, the seat belt may not provide sufficient restraining force for the passenger if an accident should occur.

SUMMARY OF THE INVENTION

Therefore, it is an object of the present invention to provide a mounting structure for an anchor of an automotive seat belt, in which the anchor is mounted on a vehicle side frame sufficiently strong to resist bending moment applied through a seat belt.

According to the present invention, the mounting structure includes a reinforcement member adapted to receive one end of a guide rail slidably supporting a vehicle sliding door. The anchor is fixedly secured to the side frame via said reinforcement member and a common fastener bolt. The reinforcement member serves to reinforce the side frame against the bending moment applied to the side frame.

The mounting structure comprises a vehicle side frame, a guide rail for slidably supporting the sliding door and extending along the side frame, the guide rail having one end curving so as to extend through an opening in the side frame, a reinforcement member disposed on the side of the side frame opposite that of the majority of the guide rail and facing the opening in the side frame and adapted to receive the one end of the guide rail, a fastener bolt for fixing the reinforcement member to the side frame, and the seat belt anchor being fixed to the side frame with the fastener bolt.

BRIEF DESCRIPTION OF THE DRAWINGS

The present invention will be understood more fully from the detailed description given herebelow with reference to the accompanying drawings of the preferred embodiment of the invention, which, however, should be understood as explanation only and to which the invention should not be limited.

In the drawings:

FIG. 1 is a perspective illustration of a vehicle having rear sliding door, for which the preferred embodiment of a seat belt anchor mounting structure is applicable;

FIG. 2 is an exploded perspective view of the vehicle of FIG. 1;

FIG. 3 is an enlarged perspective view of the major part of the vehicle to which the seat belt anchor is applied;

FIG. 4 is an enlarged perspective view of partially disassembled parts of FIG. 3.

DESCRIPTION OF THE PREFERRED EMBODIMENTS

Figure 5:
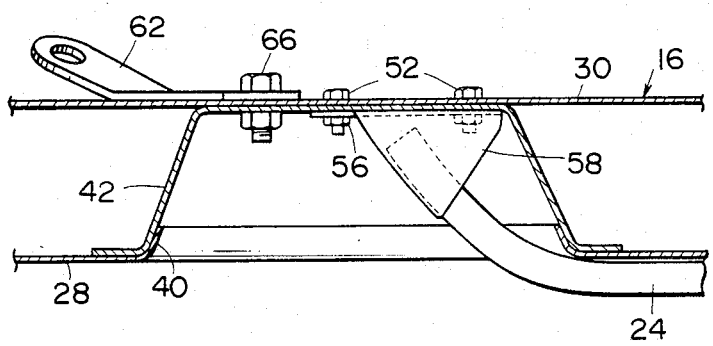
FIG. 5 is a cross-sectional view taken along line V—V of FIG. 3, but showing the guide rail for the sliding door assembled on the vehicle frame.

Referring now to the drawings, particularly FIGS. 1 and 2, a vehicle as illustrated has a center-pillarless framework to close a single door opening with a front swinging door 10 and a rear sliding door 12. In this center pillarless construction, the rear edge of the front door directly opposes the front edge of the rear door without an intervening pillar. The front edge of the front door is hinged to the front vertical edge of a door opening 14. On the other hand, the rear sliding door 12 is slidingly supported by vehicle side frames 16 and 18, such as a roof rail and a side sill. Toward this end, the sliding door 12 is provided with upper and lower slider assemblies 20 and 22 which are respectively engageable with upper and lower guide rails 24 and 26.

Each of the upper and lower rails 24 and 26 are mounted on the side frames 16 and 18 and extend essentially along the corresponding side frame. The front end of each of the upper and lower guide rails 24 and 26 curves inward and extends through an opening in the corresponding side frame 16 and 18.

As shown in FIGS. 3 to 5, the roof side rail 16 comprises outer and inner members 28 and 30 respectively. The outer member 28 is of an essentially L-shaped configuration and is connected to the side edge of a roof panel 32 via a drip channel 34. The outer member has flanges 36a, 36b along its longitudinal edges to be connected to corresponding flanges 38a, 38b of the inner member 30. The outer member 28 is formed with a through opening 40 for receiving the curved end of the upper guide rail 24. A reinforcement member 42 is housed within the roof side frame 16 at a position facing the through opening 40. The reinforcement member 42 generally comprises a horizontal section 44 and a vertical wall section 46 with flange 48 extending from the entire periphery thereof. The flange 48 is adapted to mate with the inner surface of the outer member 28. The vertical wall section 46 is fastened to the surface of the inner member 30 via fastening bolts 52 extending through openings 54 formed therein.

The fastening bolts 52 engage nuts 56 secured to a rail bracket 58 which has a portion 60 adapted to receive the front end of the upper guide rail 24, as shown in FIGS. 4 and 5. On the other hand, as shown in FIG. 5, the major portion of the upper guide rail 24 is fixed to the outer periphery of the roof side rail 16.

An anchor 62 of a seat belt is fastened to the inner member 30 with a fastening bolt 66 which extends through openings passing through the reinforcement member 42 and the inner member 30.

With the structure as set forth above, the reinforcement member 42 serves to reinforce the side frames in order to provide resistance to a bending moment applied thereto. The seat belt anchor is secured to the side frame at a point where it is reinforced by the reinforcement member. As a result, the side frame can resist bending moment applied by the seat belt in case of an accident. Furthermore, the guide rail connected to the anchor via the reinforcement member can serve to transmit the bending moment throughout the entire length of the guide rail to disperse the bending moment applied to the side frame throughout the length of the side frame and between the inner and outer members thereof. In this way, deformation of the side frame is securely prevented.

In other words, according to the shown embodiment of the invention, the anchor of the seat belt is attached to the vehicle side frame at a point where a reinforcement is provided to receive the front end of the guide rail, thus preventing deformation of the side frame due to the bending stresses applied thereto via the seat belt.

It should be noted, according to the shown embodiment, the reinforcement member is essentially of tray-shaped configuration having a width sufficient to receive therein a slider assembly of the door and to allow installation of the fastening nut for the fastening bolt for the anchor of the seat belt without interfering with movement of the slider assembly.

What is claimed is:

1. A mounting structure for an anchor of a seat belt for a vehicle having a sliding door, comprising:
   a vehicle side frame having an internal space and an opening leading to said internal space;
   a guide rail for slidably supporting said sliding door and extending along said side frame, said guide rail having one end curving so as to extend through said opening in said side frame and entering into said internal space;
   a reinforcement member disposed within said internal space of said side frame and having an opening corresponding to said opening of said side frame and receiving said curved end of the guide rail;
   a fastener bolt for fixing said reinforcement member to said side frame; and
   said seat belt anchor being commonly fixed to said side frame by said fastener bolt.

2. The structure as set forth in claim 1, wherein said curving end of said guide rail is fixed to said reinforcement member through a bracket.

3. The structure as set forth in claim 1, wherein said side frame comprises inner and outer members cooperating to define said internal space and said reinforcement member is fixed via said fastener bolt to said inner member.

4. The structure as set forth in claim 3, wherein said side frame is a roof side rail extending along the lateral edge of a vehicle roof.

5. A mounting structure for an anchor of a seat belt for a vehicle having a sliding door which is slidably suspended by a guide rail extending along a vehicle side frame, comprising:
   a reinforcement member of generally cup shaped configuration and disposed within an internal space of said side frame for receiving one end of said guide rail and for reinforcing the vehicle body against stresses due to the weight and movement of the sliding door;
   a fastener bolt fixing said reinforcement member onto an internal periphery of said side frame; and
   said anchor for the seat belt having a portion rigidly attached to an external surface of said side frame opposing a vehicle compartment and at a position corresponding to said reinforcing member, said portion of said anchor being fixed onto the external surface of said side frame by said fastener bolt.

6. The structure of claim 5, wherein one end of the guide rail curves so as to pass through an opening in the side frame, and wherein said reinforcing member is attached to the side frame opposing the opening therein on a side opposite a major portion of the guide rail and receives the curving end of the guide rail.

7. The structure of claim 6, wherein said reinforcement member is secured to the side frame with a plurality of bolts.

* * * * *